(No Model.)
J. M. HOLLER.
TEDDER.
No. 336,319.  Patented Feb. 16, 1886.
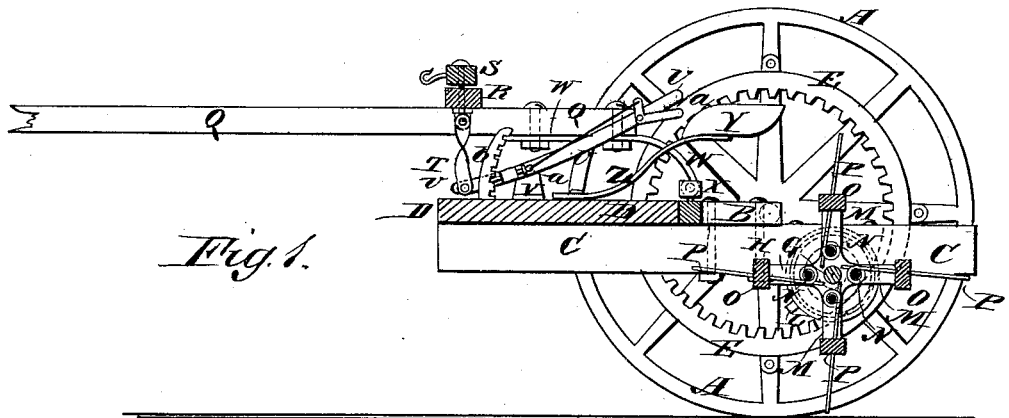
Fig. 1.
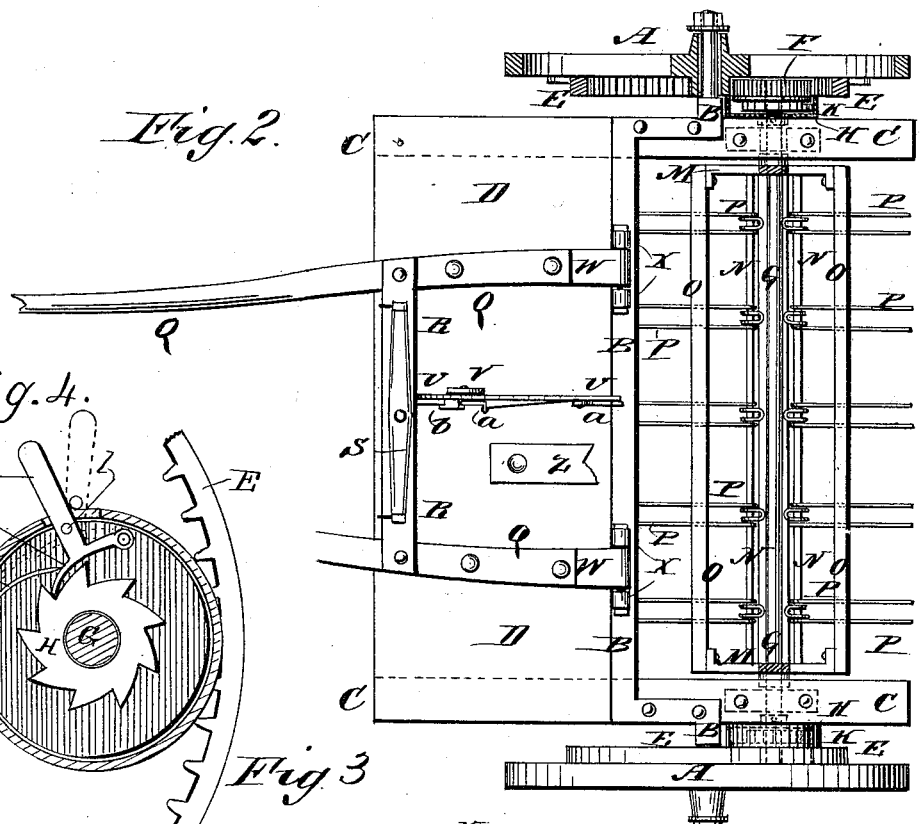
Fig. 2.
Fig. 4.
Fig. 3.
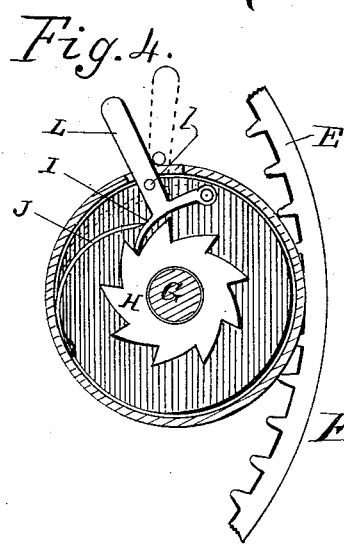
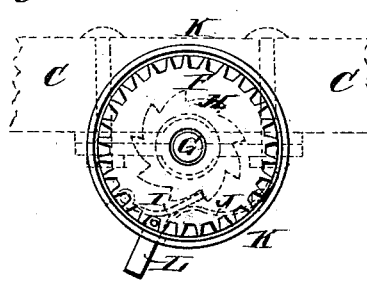
WITNESSES:
F. McArdle.
C. Sedgwick.
INVENTOR:
J. M. Holler
BY Munn & Co.
ATTORNEYS.

UNITED STATES PATENT OFFICE.

JOHN M. HOLLER, OF ALBANY, NEW YORK.

TEDDER.

SPECIFICATION forming part of Letters Patent No. 336,319, dated February 16, 1886.

Application filed January 29, 1885. Serial No. 154,239. (No model.)

*To all whom it may concern:*

Be it known that I, JOHN M. HOLLER, of the city and county of Albany, and State of New York, have invented a new and useful Improvement in Hay-Tedders, of which the following is a full, clear, and exact description.

Reference is to be had to the accompanying drawings, forming a part of this specification, in which similar letters of reference indicate corresponding parts in all the figures.

Figure 1 is a sectional side elevation of one of my improved hay-tedders. Fig. 2 is a plan view of the same, partly in section. Fig. 3 is a side elevation of one of the tedder-shaft gear-wheels and its casing, the pawl and ratchet being shown in dotted lines. Fig. 4 is a detail view on an enlarged scale.

The object of this invention is to provide hay-tedders constructed in such a manner that they will be stronger, more convenient in use, and more reliable in operation than hay-tedders constructed in the ordinary manner.

The invention consists in the construction and arrangement of parts, as will be hereinafter fully described and claimed.

A represents the drive-wheels, the axle B of which is bent twice at right angles near each journal, giving it a crank form. The crank-axle B is laid in a horizontal position, and to it are bolted two side bars, C, to which, in front of the middle part of the said axle, is attached the platform D.

To the inner sides of the drive-wheels A are secured large internally-toothed gear-wheels E, into the teeth of which mesh the teeth of the smaller gear-wheels F, placed loosely upon the ends of the shaft G. The shaft G revolves in bearings attached to the side bars, C, and to it at the inner sides of the gear-wheels F are secured the casings K, which are fast on the shaft G and revolve with it. To the inner faces of the gear-wheels F are rigidly secured ratchet-wheels H, and the casings K, which inclose these ratchet-wheels, are provided with pawls I and springs J, that of course revolve with their casings.

To the pawls I are attached, or upon them are formed, arms L, which project through slots in the casings K, so that the pawls I can be readily raised out of gear with the ratchet-wheels H when it is desired to draw the machine forward without revolving the tedder-shaft. The arms L are each provided with an aperture, *l*, adjacent to the slots in the casing, so that when the arms are raised the apertures will be above the casing, when a pin may be passed through each of them for holding the said arms raised.

To the tedder-shaft G, at the inner sides of the side bars, C, are attached the hubs of four-armed spiders or frames M, to the inner parts of the arms of which are attached rods N, and to the outer ends of the said arms are attached bars O. The tedder-teeth P are made in the form of U-shaped rods, the bends of which are bent around the rods N, as shown in Figs. 1 and 2, and their arms are passed through holes in the bars O. With this construction the bars O support the tedder-teeth P against the resistance of the hay, and at the same time allow the elasticity of the said teeth to have full play.

Q are the shafts, to the cross-bar R of which is pivoted the whiffletree S. To the lower sides of the rear ends of the shafts Q are bolted the forward parts of straps W, which project to the rearward, are curved downward, and are hinged at their rear ends to lugs X, attached to the axle B. To the cross-bar R is hinged the upper end of a short bar, T, to the lower end of which is hinged the forward end of a lever, U. The lever U is fulcrumed to a support, V, attached to the middle part of the platform D, and its rear end projects into such a position that it can be conveniently reached and operated by the driver from his seat, Y. The driver's seat Y is attached to the upper end of an inclined standard, Z, the lower end of which is attached to the middle part of the platform D. With this construction, by operating the lever U the forward end of the machine can be raised and lowered to lower and raise its rear end, and thus adjust the tedder-teeth P to work at any desired distance from the ground.

The lever U is held in any position into which it may be adjusted by a lever spring-pawl, *a*, connected with the said lever, and which engages with a toothed catch-bar, *b*, attached to the platform D.

Having thus described my invention, I claim as new and desire to secure by Letters Patent—

1. The combination, with the drive-wheels

A, having gear-wheels E on their inner sides, of the tedder-shaft G, the loose gears F F at opposite ends of said shaft, meshing with the gears E, and having ratchets H secured to their inner faces, the casings K, secured to the shaft G to turn therewith, and inclosing the ratchets, the pawls I, secured to the inner faces of the said casings, springs J, also secured to said casings, and acting to hold the pawls in engagement with the ratchets, apertured arms L, secured to or formed on the pawls and extending through slots in the casings, and pins for engaging said apertures, substantially as set forth.

2. The combination, with the fixed axle B, platform D, and the drive-wheels, of the shafts Q, having a cross-bar, R, downward-curved plates W, secured to the shafts and pivotally connected to the axle at X, the standard V on the platform, the toothed segment $b$, the lever U, pivoted between its ends to the standard V, the link T, pivotally connecting the front end of the lever to the cross-bar R, and a spring pawl or bolt, $a$, on the said lever engaging the toothed segment, substantially as set forth.

JOHN M. HOLLER.

Witnesses:
 AUSTIN L. ANDREWS,
 HENRY A. EDWARDS.